(12) United States Patent
Ghassemi

(10) Patent No.: US 7,067,932 B1
(45) Date of Patent: Jun. 27, 2006

(54) SYSTEM FOR GENERATING ELECTRICITY BY USING GRAVITATIONAL MASS AND/OR MOMENTUM OF MOVING VEHICLE

(76) Inventor: Faramarz Frank Ghassemi, 1777 Shoreline Dr., Apt. 301A, Alameda, CA (US) 94501

( * ) Notice: Subject to any disclaimer, the term of this patent is extended or adjusted under 35 U.S.C. 154(b) by 0 days.

(21) Appl. No.: 11/128,452

(22) Filed: May 13, 2005

Related U.S. Application Data

(60) Provisional application No. 60/642,953, filed on Jan. 7, 2005.

(51) Int. Cl.
*H02P 9/04* (2006.01)
(52) U.S. Cl. ............................................. 290/1 R
(58) Field of Classification Search ............. 290/1 R, 290/1 C, 45, 1 A; 417/229; 404/71; 60/398, 60/325
See application file for complete search history.

(56) References Cited

U.S. PATENT DOCUMENTS

| | | | |
|---|---|---|---|
| 1,916,873 A | | 7/1933 | Wiggins |
| 4,173,431 A | * | 11/1979 | Smith ..................... 417/229 |
| 4,238,687 A | | 12/1980 | Martinez ................... 290/1 R |
| 4,239,974 A | * | 12/1980 | Swander et al. ........... 290/1 R |
| 4,239,975 A | | 12/1980 | Chiappetti ................... 290/1 |
| 4,250,395 A | * | 2/1981 | Lundgren .................. 290/1 R |
| 4,434,374 A | | 2/1984 | Lundgren .................. 290/1 R |
| 4,437,015 A | | 3/1984 | Rosenblum ................ 290/1 R |
| 4,739,179 A | | 4/1988 | Stites ........................ 290/1 R |
| 4,980,572 A | | 12/1990 | Sen ........................... 290/1 R |
| 5,355,674 A | * | 10/1994 | Rosenberg ................... 60/325 |
| 6,353,270 B1 | | 3/2002 | Sen ........................... 290/1 R |
| 6,376,925 B1 | * | 4/2002 | Galich ....................... 290/1 R |
| 6,494,144 B1 | | 12/2002 | Sanchez ..................... 104/287 |
| 6,767,161 B1 | | 7/2004 | Calvo et al. ................. 404/71 |
| 6,858,952 B1 | * | 2/2005 | Gott et al. .................. 290/1 R |
| 6,949,840 B1 | * | 9/2005 | Ricketts ..................... 290/1 R |
| 2003/0034652 A1 | | 2/2003 | Slatkin ...................... 290/1 R |
| 2005/0200132 A1 | * | 9/2005 | Kenney ..................... 290/1 R |

* cited by examiner

*Primary Examiner*—Julio C. Gonzalez
(74) *Attorney, Agent, or Firm*—Schneck & Schneck; Thomas Schneck

(57) ABSTRACT

A mechano-electrical energy generation system generates electrical energy from the passage of a vehicle over an inclined ramp assembly. This assembly includes an incline ramp that is rotatable about an axis proximate a vehicle roadway surface, and a safety decline ramp hinged with and rotatable with the incline ramp. The incline ramp is coupled via a roller assembly to a gravity wheel that drives a flywheel coupled to an electrical generator. As a result, passage of the vehicle over the incline ramp rotates the wheel via the roller assembly and drives the flywheel so that the electrical generator outputs electrical energy. When the vehicle exits the safety decline ramp, a counterweight rotates the wheel in a reverse direction, so as to bring the incline ramp and safety decline ramp to back to their original inclined positions above the roadway surface.

20 Claims, 8 Drawing Sheets

SYSTEM FOR GENERATING ELECTRICITY BY USING GRAVITATIONAL MASS AND/OR MOMENTUM OF MOVING VEHICLE

CROSS-REFERENCE TO RELATED APPLICATION

The present application claims the benefit of now abandoned U.S. Patent Application Ser. No. 60/642,953, by F. Ghassemi et al, entitled: "Energy Recovery System," filed Jan. 7, 2005, and the disclosure of which is incorporated herein.

FIELD OF THE INVENTION

The present invention relates in general to mechano-electrical energy generation systems, and is particularly directed to a 'kinetic energy/gravity power plant' (KGPP) method and apparatus for generating electrical energy from the passage of a vehicle over an inclined and rotatable ramp assembly. The ramp assembly includes an incline ramp that is rotatable about an axis proximate a roadway surface on which the vehicle travels, and a safety decline ramp hinged with and rotatable with the incline ramp. The incline ramp is coupled via a roller assembly to a gravity or 'G' wheel that drives a flywheel coupled to an electrical generator. As a result, passage of the vehicle over the incline ramp causes the roller assembly to rotate the wheel and reduce inclinations of the incline ramp and the safety decline ramp above the roadway surface. As the incline ramp is rotated downwardly toward the road, it rotates the wheel to drive the flywheel and cause the electrical generator to produce electrical energy. Once the vehicle exits the safety decline ramp, a counterweight coupled to the wheel urges the roller assembly against the bottom surface of the incline ramp, and rotates the wheel in a reverse direction, so as to bring the incline ramp and safety decline ramp to back to their original inclined positions above the roadway surface.

BACKGROUND OF THE INVENTION

The consumption of electrical power has undergone a relatively rapid increase in recent years. For example, in the United States and in developed countries, the increase in the application and usage of computers, as well as hybrid/electric cars, has created a demand for more electric power plants. The present invention is considered to fall into the general category of renewable electric power sources, such as, but not limited to, wind-power systems, hydro-electric power systems and solar-power generation systems, and gravity-based power plants, where the source of energy is basically free. In the context of mechano-electric power systems, the gravitational mass and kinetic energy/momentum of moving road vehicles (e.g., automobiles and trucks) constitute a free source of energy, especially on downhill slopes where cars and trucks are urged in the downhill direction by their gravitationally pulled masses. The basic concept involved in kinetic energy/gravitational power plant (KGPP) or kinetic energy/gravitational electricity generation involves the translation of a moving mass that is pulled by gravity into mechanical and rotational motion, which is used to drive a standard electrical generator.

SUMMARY OF THE INVENTION

In accordance with the present invention, advantage is taken of the components of kinetic energy/gravitational electricity generation; in particular, the kinetic energy/momentum and gravitational mass of a moving vehicle are used to create a linear or semi-linear mechanical motion. This motion, in turn, is translated into rotation, which turns an electrical generator, the output of which is electrical power. More particularly, as described briefly above, the present invention is directed to a mechano-electrical energy generation system for generating electrical energy from the passage of a vehicle over a ramp assembly, that is mechanically biased to be inclined above the roadway as it is approached by a moving vehicle. The ramp assembly includes an incline ramp that is rotatable about an axis proximate a roadway surface on which the vehicle travels, and a safety decline ramp hinged with the incline ramp. The incline ramp is coupled via a roller-bearing assembly to a wheel, such that passage (weight and movement) of a vehicle onto and over the inclined ramp causes the ramp to rotate downwardly, and rotate the wheel in a direction that drives a flywheel coupled to an electrical generator. This action continues until the inclinations of the incline ramp and the safety decline ramp above the roadway surface have decreased such that the ramp assembly is essentially parallel to the roadway surface. Once the vehicle exits the safety decline ramp, a counterweight coupled to the wheel urges the roller assembly against the bottom surface of the incline ramp, and rotates the wheel in a reverse direction, so as to bring the incline ramp and safety decline ramp to back to their inclined positions above the roadway surface.

DETAILED DESCRIPTION

Figure 1:
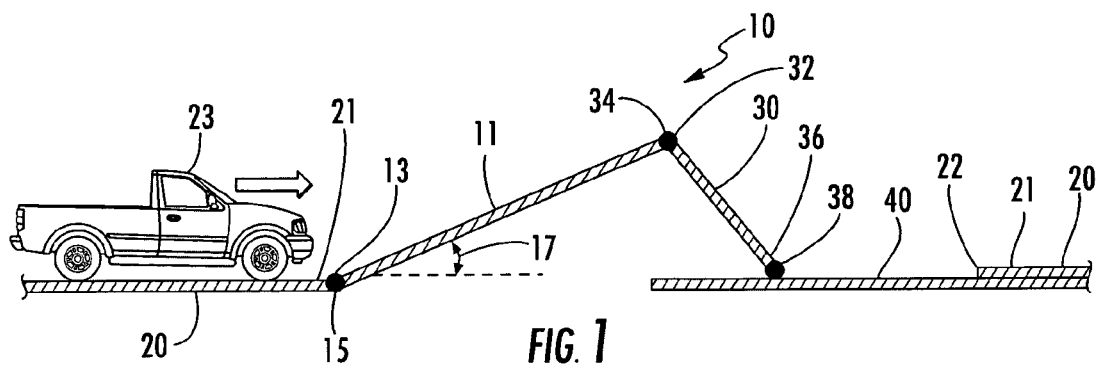
FIG. 1 diagrammatically illustrates the condition of a ramp assembly employed in the kinetic energy/momentum/gravity based mechano-electrical energy generation system in accordance with the present invention prior to being engaged by a vehicle.
Figure 2:
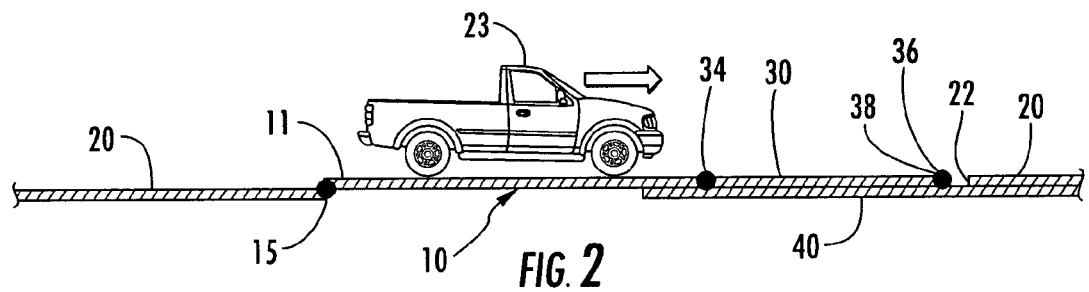
FIG. 2 shows the condition of a ramp assembly of the invention, wherein a vehicle has driven completely onto the ramp assembly.
Figure 5:
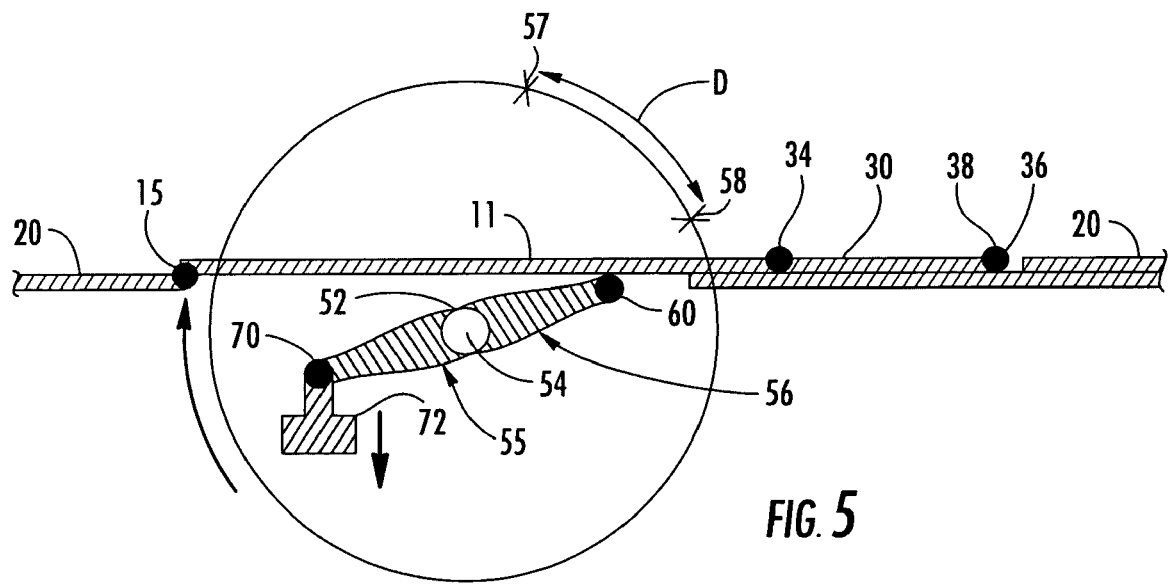
FIG. 5 shows the orientation of a wheel of the system of the invention, where incline and decline ramps have been rotated so as to be generally parallel to the roadway surface.

Attention is initially directed to FIG. 1, which diagrammatically illustrates an embodiment of a ramp assembly 10 employed in the kinetic energy/momentum/gravity based mechano-electrical energy generation system in accordance with the present invention. As shown therein, the ramp assembly 10 includes a rotatable incline ramp 11, having a first end 13 coupled to a hinge 15, that is proximate the surface 21 of a roadway 20, upon which a vehicle 23 (such as but not limited to a truck) travels (in a left to right direction as viewed in the Figure). The ramp assembly further includes a safety decline ramp 30 having a first end 32, that is rotatably hinged at 34 to the incline ramp 11, and a second end 36 provided with a set of roller bearings 38 that are arranged to travel upon generally flat surface 40, which is parallel to and slightly below than the roadway surface by the thickness of the decline ramp 30. The roller bearings are preferably confined in a track system on opposite sides of the roadway that prevents the second end 36 of the safety decline ramp from lifting off the roadway surface, so that the vehicle exits the ramp assembly safely without being struck by any part of the ramp assembly. Instead, the roller bearings 38 at the second end 36 of the safety decline ramp travel along the roadway in a direction that is parallel to its surface so that the second end 36 of the ramp assembly 'safely' clears the vehicle. Preferably, the sum of the lengths of the incline ramp 11 and the safety decline ramp 30 effectively corresponds to the distance between the hinge 15 at the first end 13 of the incline ramp 11 and a location 22 of the roadway surface 21 where the generally flat surface 40 adjoins the roadway 20. In addition, the distance or length over which the surface 40 extends from location 22 of the roadway surface 21 is sufficient to underlie and support both the roller bearings 38 and the hinge 34 between the incline ramp 11 and the safety decline ramp 30, when the ramp assembly is rotated downwardly to its generally flat orientation that is effectively parallel with the roadway 20, as shown in FIGS. 2 and 5, for example. In the diagrammatic illustration of FIG. 1, each of the incline ramp 11 and the safety decline ramp 30 are shown as being biased to a prescribed 'up' or uppermost angular orientation 17 of the incline ramp 11 relative to the roadway surface, as the ramp assembly is being approached by vehicle 23.

FIG. 2 shows the condition of the ramp assembly 10, wherein vehicle 23 has driven onto the ramp assembly, causing the incline ramp 11 to have rotated clockwise about the axis of hinge 15 and the safety decline ramp 30 to have rotated counter-clockwise relative to hinge 34, with its bearing (38)—supported end 36 having been translated horizontally so as to be immediately adjacent to location 22 of the roadway 20 where the generally flat surface 40 adjoins the roadway surface. In particular, the incline ramp 11 has been caused to rotate downwardly or clockwise as viewed in the Figure, as a result of the inertial momentum of the vehicle upon the incline ramp 11, as well as it's gravitational weight. Since the second end 36 of the safety decline ramp 30 contains bearings 38 that roll on the surface 40, the safety decline ramp 30 has moved forwardly and downwardly so that the incline ramp 11 and decline ramp 30 are generally parallel to the roadway 20.

Figure 3:
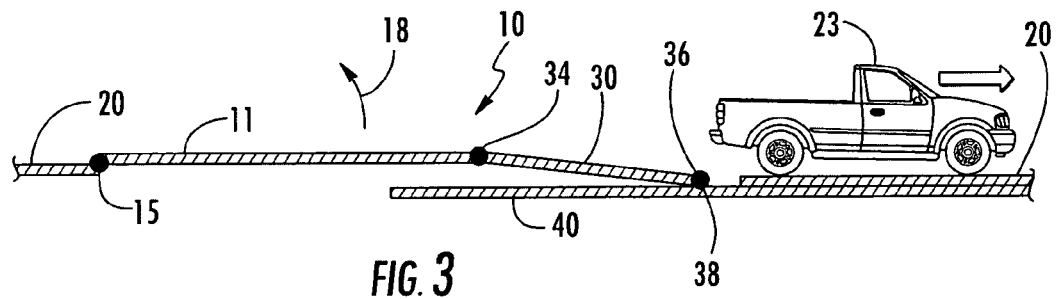
FIG. 3 shows a vehicle just departing the safety decline ramp of a ramp assembly of the invention and proceeding onto a roadway.

FIG. 3 shows the vehicle 23 just departing the safety decline ramp 30 and proceeding onto the roadway 20. Once the vehicle leaves the decline ramp, the ramp assembly 10 is biased back toward its original inclined orientation (as denoted by arrow 18) of FIG. 1, described above. In the course of this return action of the ramp assembly, the second end 36 of the safety decline ramp 30 slides (to the left as viewed in FIG. 3) along the generally flat surface 40 adjoining the roadway surface, so that the decline ramp safely 'clears' the vehicle. Namely, since the decline ramp 30 undergoes a sliding motion as it rotates about its hinge 34 with the incline ramp 11, the back end of the vehicle will not be impacted by the upward motion of the incline ramp (including hinge 34) or the upward and backsliding motion of the safety decline ramp.

Figure 4:
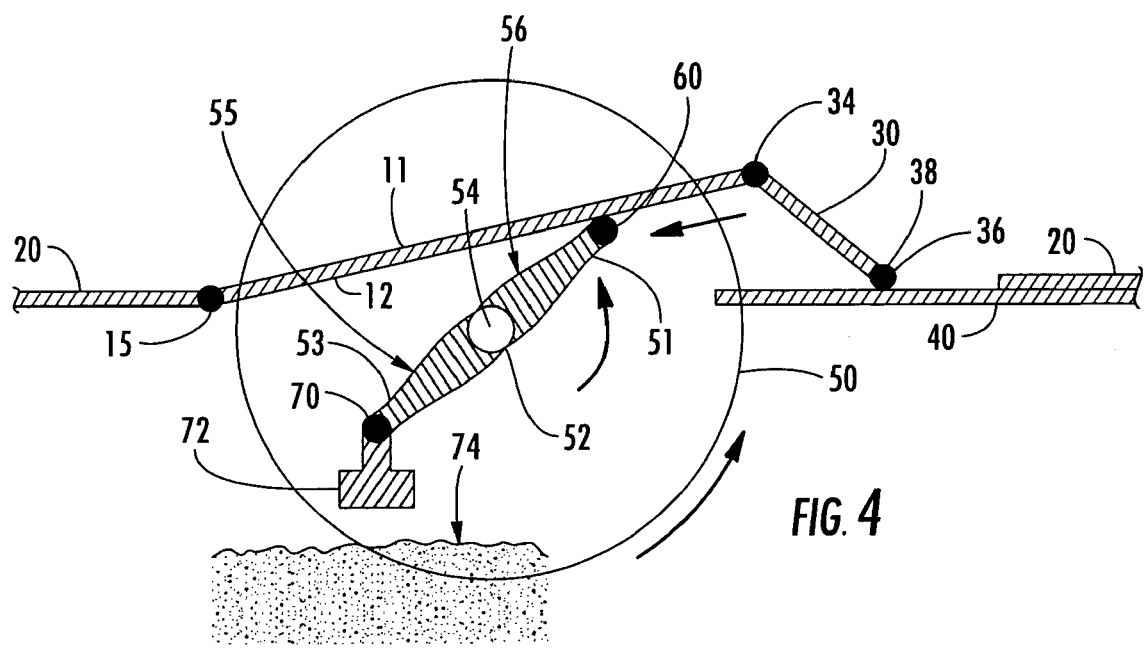
FIG. 4 shows a wheel assembly that is employed in accordance with the present invention to bias the ramp assembly of FIGS. 1–3 into its 'up' orientation in the absence of a vehicle on the ramp assembly, and to allow the ramp assembly to rotate the wheel when the inclined ramp is engaged by a vehicle.
Figure 12:
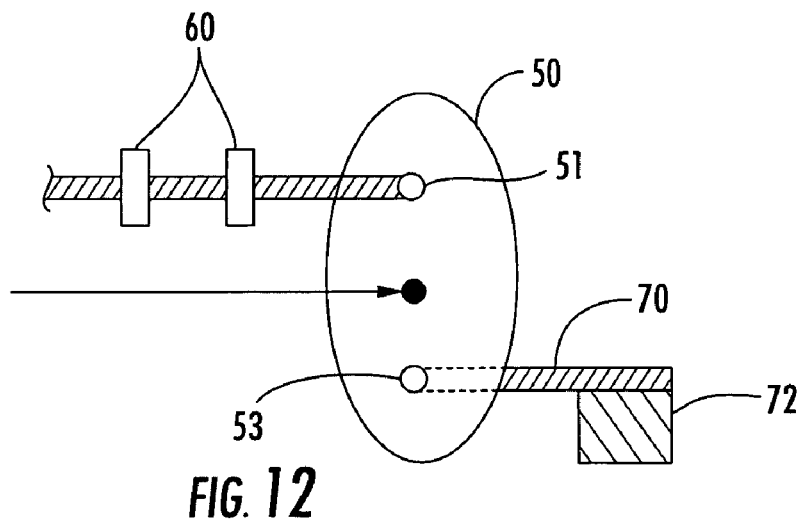
FIG. 12 shows a roller bearing assembly coupled to a first location of the wheel and extending generally parallel to the wheel axis, the roller bearing assembly being arranged to engage a bottom surface of the incline ramp in response to the wheel being rotated in a counter-clockwise direction.

FIG. 4 shows a wheel assembly that is employed in accordance with the present invention to bias or urge the ramp assembly into its inclined or 'up' orientation (shown in FIG. 1), in the absence of a vehicle on the ramp assembly, and to allow the ramp assembly to rotate the wheel assembly when the inclined ramp is engaged by a vehicle. In particular, FIG. 4 shows a gravity or 'G' wheel 50 having a shaft 52 that is rotatable about a wheel axis 54, which is generally parallel to the axis of rotation of the hinge 15 about which the incline ramp 11 rotates. As also shown in FIG. 12, coupled to a first location 51 of the wheel 50 and extending generally parallel to the wheel axis 54 is a roller (bearing) assembly 60 that is arranged to be urged against and rotationally slide along a bottom surface 12 of the incline ramp 11, in response to the wheel being rotated in a counter-clockwise direction (as viewed in FIG. 4).

Coupled to a second location 53 of the wheel, that is preferably generally diametrically opposed to the first location 51 (as shown by the lines 55 and 56), is a counter-weight bearing 70, from which hangs a counter-weight 72. The effect of gravity on the mass of the counter-weight 72 is sufficient to cause the wheel 50 and its associated roller assembly 60 to rotate in a counter-clockwise direction and urge the roller assembly 60 into contact with the bottom surface of the incline ramp 11, and rotate the wheel so as to bring the incline ramp 11, and the safety decline ramp 30 hinged thereto, to their respective inclined positions above the roadway surface in the absence of a vehicle engaging the ramp assembly. The counter-weight 72 comes to rest against a stop 74, so that the ramp assembly cannot move higher than a pre-designated 'up' orientation. However, in response to engagement of a vehicle 23 with the incline ramp 11, the counter-weight 72 allows the roller assembly 60 to rotate the wheel 50 (clockwise, as viewed in FIG. 4) about the wheel shaft axis 54, thereby reducing inclinations of the incline ramp 11 and the decline ramp 30 above the roadway surface.

FIG. 5 shows the orientation of the wheel 50, where the respective incline and decline ramps 11 and 30 have been rotated so as to be generally parallel to the roadway 20, as described above with reference to FIG. 2, so as to cause the wheel 50 to have rotated a circumferential distance 'D' between positions 57 and 58. It may be noted that the counter-weight 72 continues to impart an upward bias against the wheel 50 that would rotate the wheel in a counter-clockwise direction, but for the presence of a vehicle on the ramp assembly.

Figure 6:
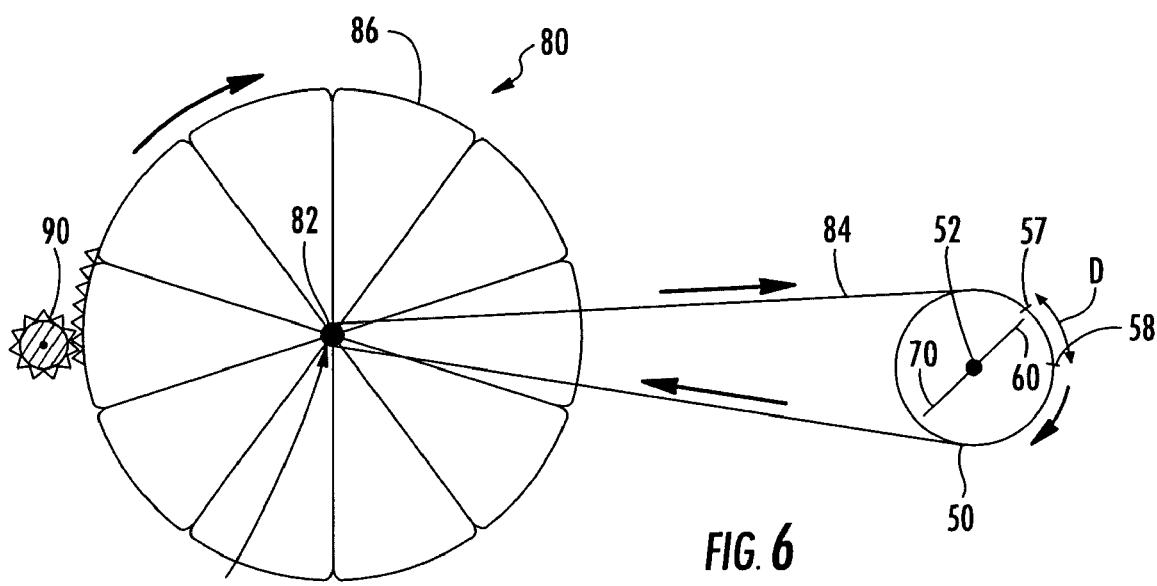
FIG. 6 shows a flywheel having a crankshaft and gear assembly that is coupled to the wheel of the system of the invention by way of a closed loop drive web member.

FIG. 6 shows a flywheel 80, which is used to store and regulate rotational energy. The flywheel has a crankshaft and gear assembly 82 that is coupled to the wheel 50 by way of a closed loop web or belt member 84, which may be readily implemented by means of a chain and sprocket arrangement. The circumference or perimeter 86 of the flywheel 80 is coupled to rotationally engage an electrical generator 90. The crankshaft and gear assembly 82 of the flywheel 80 is such as to allow the flywheel to be driven in and rotated in one direction only (e.g., clockwise, as viewed in the Figure), so that rotation of the wheel 50 by the action (downward movement) of the incline ramp, in response to a vehicle traversing the ramp assembly, will cause rotation of the wheel 50 over a prescribed arcuate distance 'D' around the circumference thereof, thereby rotating the closed loop 84 and driving the flywheel 80. Since the flywheel 80 is rotationally engaged with the electrical generator 90, downward movement of the inclined ramp causes production of electrical energy.

From the foregoing description of the various components of the invention, operation of the overall energy conversion system is straightforward. In the following discussion, attention may be directed to the diagrammatic side views of FIGS. 1–6, described above, which show respective portions of the vehicle passage responsive, mechano-electrical generation system of the present invention, as well as the plan view of FIG. 7 which is a diagrammatic plan view of the overall system. As noted previously, forward momentum of a vehicle engaging the ramp assembly 10 plus the gravitational mass of the vehicle on the incline ramp 11 cause the incline ramp itself and consequently the roller bearing assembly 60 biased thereagainst by the counter-clockwise bias rotation of the wheel 50 against the bottom of the ramp 11 to move forward and downward. This motion of the roller bearing assembly 60 causes the wheel 50 to rotate in a the clockwise (forward) direction by a distance 'D', which is proportional to the angle of inclination of the incline ramp 11 and the radius of the wheel 50. Namely, the arc distance 'D' is the distance of the travel of a point on the circumference of the wheel 50 from location 57, where the wheel rotates from the 'up' ramp assembly orientation (e.g., FIGS. 1 and 4) to a location 58 associated with a flat ramp assembly orientation (e.g., FIGS. 3 and 5). FIGS. 3 and 5 show the release of the ramp assembly just after the vehicle 23 leaves the safety decline ramp 30. As shown in FIG. 5, the counter-weight 72 coupled to the counter-weight bearing 70 of the wheel 50 has been translated from a ramp-lift position up to a ramp-flat position. As the vehicle leaves the decline ramp, the gravitational attraction of the counter-weight 72 in a vertically downward direction rotates the wheel 50 counter-clockwise and, as a result, the roller bearing assembly 60 of the wheel 50 pushes the ramp assembly back to its 'upmost' position. The counter-weight 72 comes to rest against the stop 74, so that the ramp assembly cannot move higher than a pre-designated inclination orientation. As another vehicle engages and traverses the ramp assembly, as described above, the wheel 50 again rotates in clockwise direction by a distance D.

Figure 7:
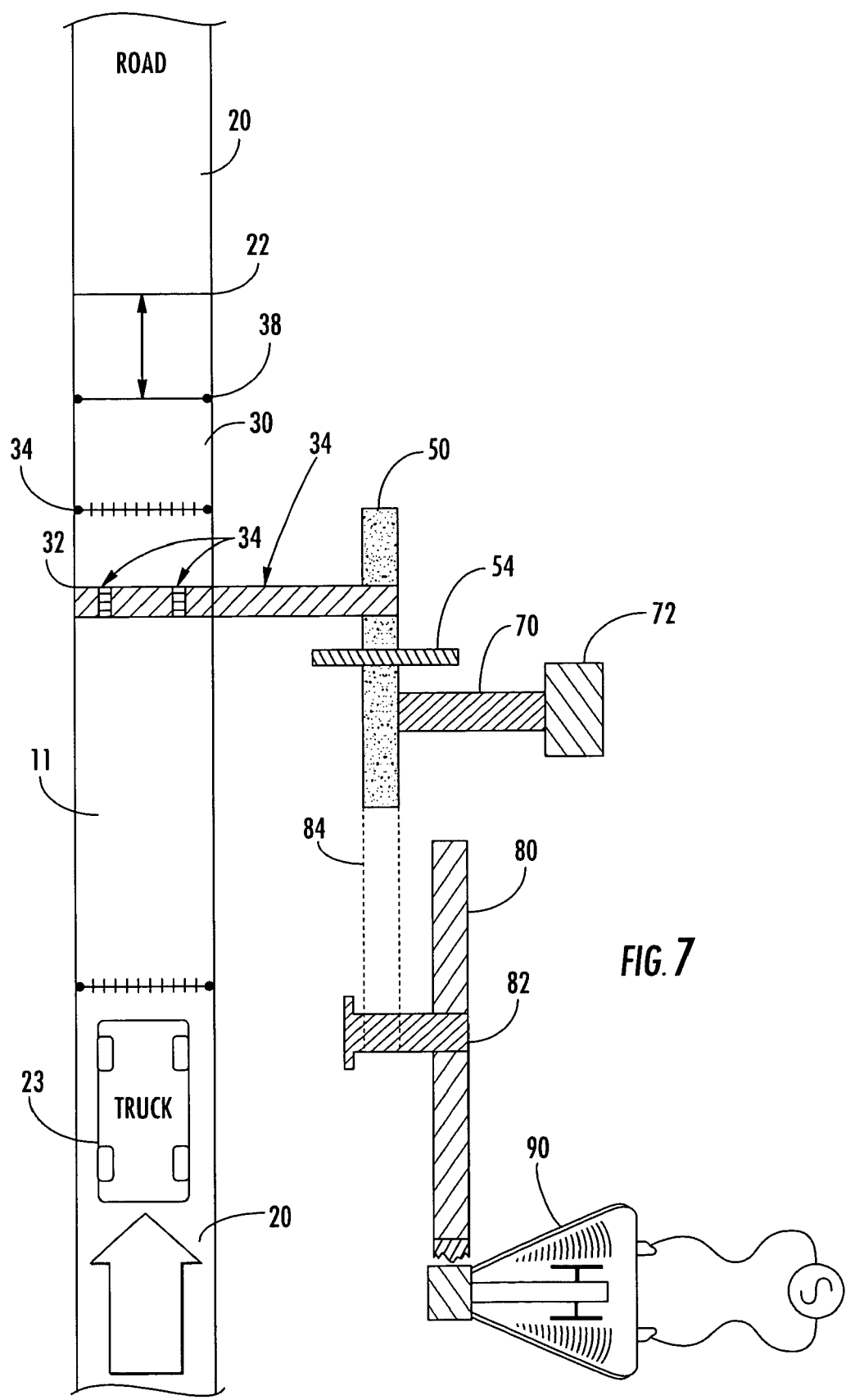
FIG. 7 is a diagrammatic plan view of an embodiment of the overall kinetic energy/gravity-based, mechano-electrical energy generation system of the present invention.

Repeated engagements with the ramp assembly by additional vehicles will cause an oscillating (clockwise and counter-clockwise) rotation of the wheel 50 which, in turn, results in repeated (clockwise) rotation of the flywheel 80. As noted above, the flywheel's crankshaft is at the center of a free wheel hub mechanism where a ratchet gear system allows only forward (clockwise) rotation of the flywheel. Moreover, as shown in FIGS. 6 and 7, the loop 84 connects the wheel 50 to the crankshaft of the flywheel, so that the flywheel will continue to rotate (clockwise) in a freewheeling manner, when the wheel is driven counter-clockwise by the action of the counter-weight, similar to the action of the pedaling of a bicycle.

As shown in FIG. 6, the distance D (arc motion distance) of the conveyor belt or chain is several times larger than the circumference of the gear of the flywheel. Therefore, each time that the ramp assembly goes down as the result of the travel of a vehicle over it, the flywheel rotates several turns in the forward motion. When the ramp assembly goes up, i.e., when the wheel 50 rotates counter-clockwise, the flywheel 80 still rotates clockwise due to the freewheeling mechanism. The flywheel makes the system run more smoothly. This is due to the fact that when the ramp assembly is not moving or there is a delay between vehicles, the electric generator is still driven by the flywheel. Moreover, the flywheel can contain an automatic gear system which will vary and shift to higher or lower gears according to the speed of the oscillating motion (rotation) of the wheel.

As described in the foregoing, the linear up-down motion of the ramp assembly 10 results in an oscillating rotation of the wheel 50. This oscillating rotation is transferred to flywheel 80 which has a ratchet and freewheeling hub system. The flywheel rotates in clockwise motion which causes the electric generator to spin rapidly and generate electricity. Deterministic calculation of a ramp with an up inclination angle of seven degrees and a height of ten feet shows that a constant flow of trucks on such ramp can produce up to megawatts of power.

Figure 8:
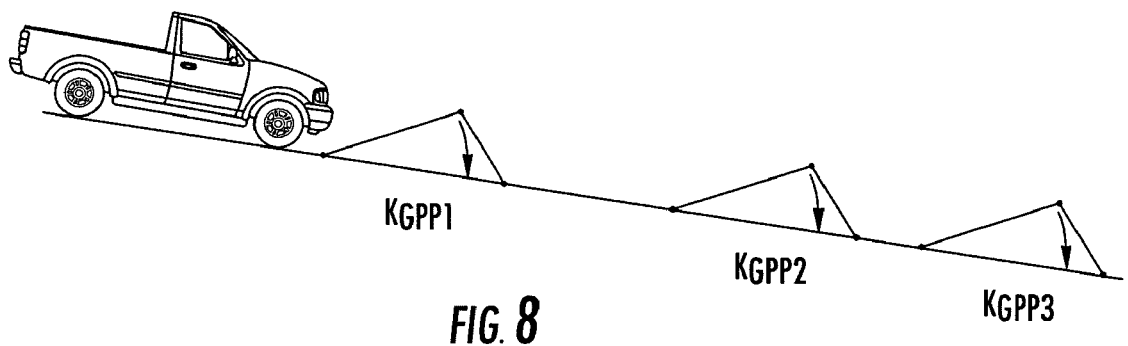
FIG. 8 diagrammatically illustrates the installation of the system of the present invention at multiple locations of a downhill grade.

Non-limiting examples of locations for installing the mechano-electrical conversion system of the present invention include truck stops, where trucks are forced to slow down, go over possible bumps and then go on a route off of the highway. The best efficiency and most power are generated by installing the system on a downward slope, although it is to be understood that the system may alternatively be installed on a generally horizontal roadway. For example, installing the system at multiple (e.g., ten to twenty) locations as diagrammatically illustrated in FIG. 8, represented by locations KGPP1, KGPP2 and KGPP3, down the slopes of the Grapevine in California, which has a seven degree grade over a stretch of one-half mile, can generate megawatts of power. As is well known, trucks are forced to slow down on downhill slopes. Therefore, trucks going downhill and over the ramp assemblies of multiple systems of the invention do not use any extra energy.

Once a truck driver has slowed down his truck, so that it can go downhill, then, as the truck moves over the ramp assemblies, the incline ramps are sequentially rotated downwardly with it, due to the flatness of the road. Therefore, there is no danger or possibility for the travel of the truck to be diverted by the edge of the ramp assembly unless the ramp assembly is jammed in its up orientation. The system of the invention is designed for ease of use with trucks. Trucks need to be able to move smoothly on and over the ramp assembly. FIGS. 2, 3 and 5 show that the sliding end 36 of the decline ramp at its flat orientation at location 22 has a very modest and minimum gap to the flat part of the surface of the road. This ensures that trucks will not feel a bump or drop as they go over the ramp assembly.

It is recommended that safety measures be considered at each installation of the invention. To this end, it is considered expedient to have barriers installed on both sides of the system to prevent people or animals form falling into gaps and free spaces of the system. Again, it should be emphasized that with the invention, a vehicle (e.g., truck) driver may not ever feel as though his vehicle is going over a bump. When the vehicle goes over the ramp assembly, because of the fact that the incline ramp rotates downwardly to a flat position, the driver will feel as though he is driving on smooth road. A ramp grade of seven degrees or a even a few degrees higher or lower will provide a comfortable ride. Although the design of the system prevents the ramp assembly from jamming or getting stuck in its up position, warning signals may be employed to prevent vehicles from falling off the ramp, in case the ramp assembly becomes stuck in its up position.

Figure 9:
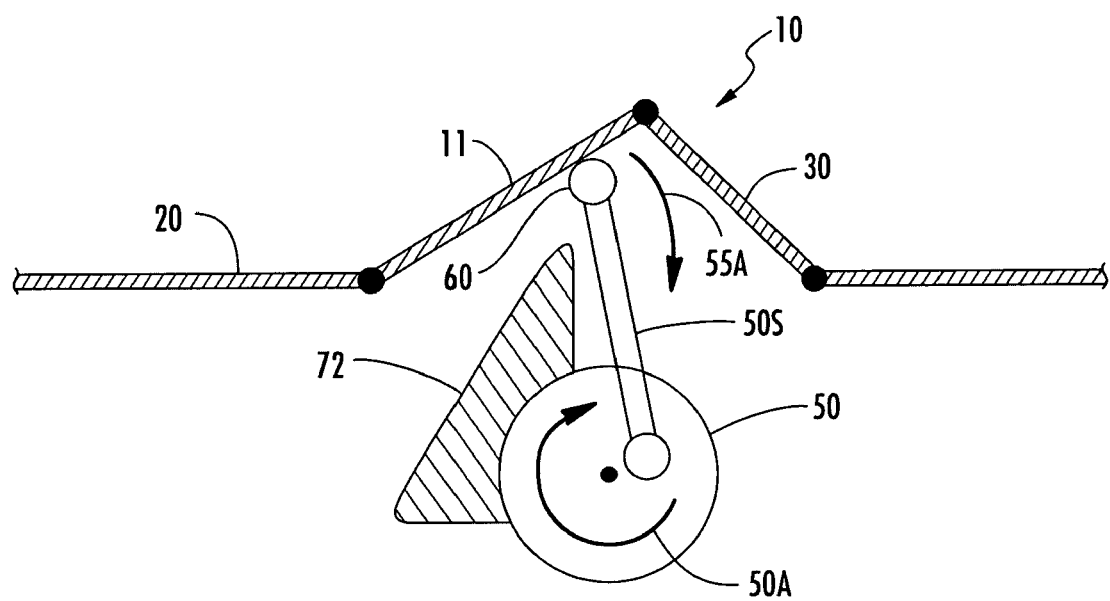
FIG. 9 shows an alternative embodiment of a component-intercoupling arrangement and reciprocating motion assembly that may be used in the present invention.

It should be noted that component-intercoupling arrangements and reciprocating motion assemblies other than those described above may be used to translate the ramp assembly's up-down motion into rotation, such as that shown in FIG. 9, which employs a counter weight 72 attached to the wheel 50 and operates like an oil well derrick. Here, as the wheel 50 rotates in the direction of arrow 50A, the shaft 50S travels downwardly in the direction of arrow 55A, so that the incline ramp follows the roller bearings 60. With this design trucks may be regulated by a traffic light to go completely over the ramp assembly and finish a full cycle of rotation of the ramp assembly before the next truck traverses the system. It should be noted that artifices for transferring motion of a flywheel to an electric generator are common knowledge and many forms are in use. This technology has advanced in trucks and automobiles where the rotation of the crankshaft of the engine is transferred by belts to alternators and by chains and gears, gearbox, manual and automatic transmission systems to the wheels. The use of the flywheel in accordance with the present invention is a convenience for flexibility of truck arrivals on the ramp assembly. As an alternative, the flywheel may be removed and the rotation of the wheel may be directly transferred to the electric generator by chains, gears, belts, and the like.

As will be appreciated from the foregoing description, pursuant to the invention, the inertial energy of a moving vehicle and the gravitational weight of a downwardly moving vehicle may be readily converted into mechanical rotation which can turn an electric generator. The primary functions of the system are those of the ramp assembly where a moving vehicle causes a linear or semi-linear motion. The linear motion is translated by a roller assembly mechanism into a full rotation or a partial rotation of a wheel. The rotation of the wheel is transferred to rotate an electric generator by means of chains, belts and gears, and the like.

Figure 10:
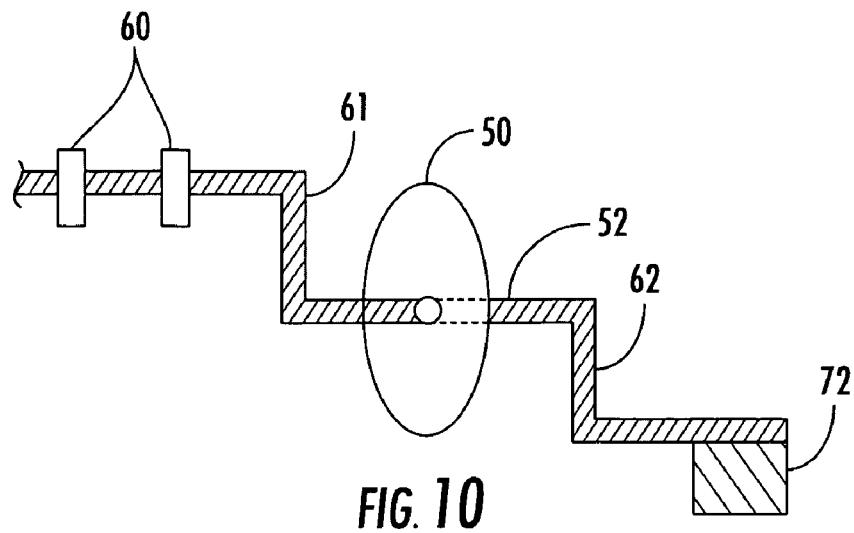
FIG. 10 diagrammatically illustrates an embodiment wherein an opposite ends of the wheel shaft are coupled to by means of connecting rods to a bearing assembly and a counter-weight
Figure 11:
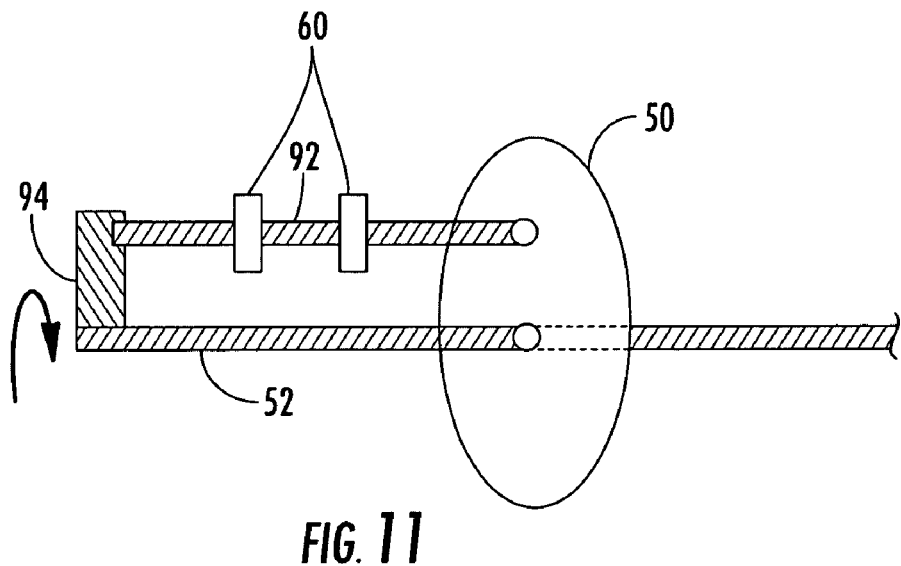
FIG. 11 shows a further embodiment wherein the bearing assembly is supported on a shaft that engages the wheel at a first location and is coupled to the wheel shaft via a coupling joint.
Figure 13:
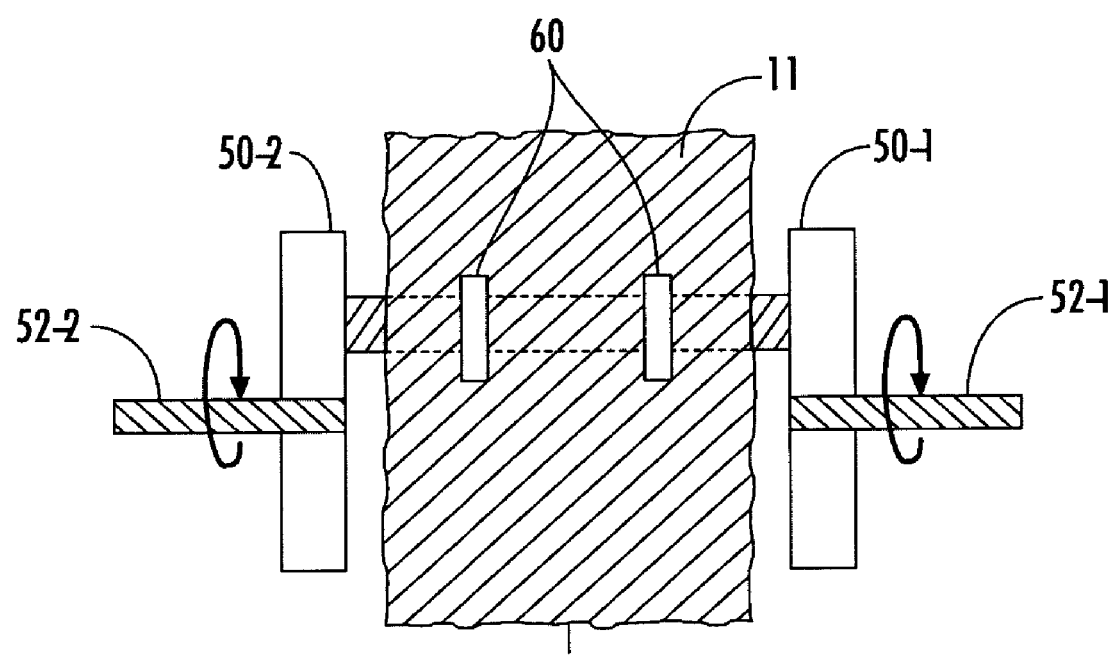
FIG. 13 shows the case where multiple wheels are respectively rotatable about axes provided on opposite sides of the ramp so a to provide additional support for the bearings.

To this end, FIG. 10 diagrammatically illustrates an embodiment wherein an opposite ends of the wheel shaft are coupled to by means of connecting rods to bearing assembly 60 and counter-weight 72. Similarly, FIG. 11 shows a further embodiment wherein the bearing assembly 60 is supported on a shaft 92 that engages the wheel 50 at location 51 and is coupled to the wheel shaft 52, via a coupling joint 94. FIG. 13 shows the case where multiple wheels 50-1 and 50-2, respectively rotatable about axes 52-1 and 52-2 are provided on opposite sides of the ramp 11, so a to provide additional support for the bearings 60.

While we have shown and described several embodiments in accordance with the present invention, it is to be understood that the same is not limited thereto but is susceptible to numerous changes and modifications as known to a person skilled in the art. We therefore do not wish to be limited to the details shown and described herein, but intend to cover all such changes and modifications as are obvious to one of ordinary skill in the art.

What is claimed:

1. An apparatus for generating electrical energy from the passage of a vehicle thereover comprising:
   a rotatable incline ramp that is rotatable about an incline axis of rotation proximate a roadway surface on which said vehicle travels;
   a rotatable decline ramp having a first portion that is rotatably hinged to said rotatable incline ramp and second portion that is arranged to travel in a direction generally parallel to said roadway surface;
   a rotatable wheel that is rotatable about a wheel axis generally parallel to said incline axis of rotation;
   a roller assembly that is coupled to a bottom surface of said incline ramp and is joined with a first portion of said wheel;
   a counterweight that is joined with a second portion of said wheel, and is operative to urge said roller assembly into contact with said bottom surface of said incline ramp, and rotate said wheel so as to bring said inclined ramp and said decline ramp to inclined positions above said roadway surface in the absence of the passage of said vehicle over said incline ramp, but allowing passage of said vehicle over said incline ramp to cause said roller assembly to rotate said wheel about said wheel axis and reduce inclinations of said incline ramp and said decline ramp above said roadway surface; and
   an electrical generator coupled to said wheel and being operative to generate electricity in response to rotation of said wheel about said wheel axis.

2. The apparatus according to claim 1, wherein said rotatable incline ramp and said rotatable decline ramp are operative to rotate into positions generally parallel to said roadway surface, in response to the passage of a vehicle over said rotatable incline ramp and said rotatable decline ramp, and to remain generally parallel to said roadway surface until said vehicle has departed said rotatable decline surface, whereupon said counterweight is operative to return said incline ramp and said decline ramp to inclined positions above said roadway surface with the decline ramp sliding along the roadway surface so as to safely clear said vehicle.

3. The apparatus according to claim 1, wherein said electrical generator is driven by a flywheel that is coupled to and rotationally driven by said wheel.

4. The apparatus according to claim 3, wherein said flywheel is rotatable about a crankshaft having a ratchet mechanism that is operative to allow said flywheel to rotate in a prescribed rotational direction.

5. The apparatus according to claim 4, wherein said flywheel crankshaft is coupled by a closed loop web to said wheel.

6. The apparatus according to claim 1, wherein said roller assembly includes roller bearings supported by a shaft that is coupled to said first portion of said wheel.

7. The apparatus according to claim 1, wherein said roadway surface is a downhill roadway surface.

8. A system for generating electrical energy from the passage of a vehicle thereover comprising a plurality of electrical generator assemblies sequentially arranged along a road, so as to be sequentially engaged by a vehicle traveling along said road, a respective electrical generator assembly including:
   a rotatable incline ramp that is rotatable about an incline axis of rotation proximate a roadway surface on which said vehicle travels;
   a rotatable decline ramp having a first portion that is rotatably hinged to said rotatable incline ramp and second portion that is arranged to travel in a direction generally parallel to said roadway surface;

a rotatable wheel that is rotatable about a wheel axis generally parallel to said incline axis of rotation;

a roller assembly that is urged against and rotationally slides along a bottom surface of said incline ramp and is joined with a first portion of said wheel;

a counterweight that is joined with a second portion of said wheel, and is operative to urge said roller assembly into contact with said bottom surface of said incline ramp, and rotate said wheel so as to bring said inclined ramp and said decline ramp to inclined positions above said roadway surface in the absence of the passage of said vehicle over said incline ramp, but allowing passage of said vehicle over said incline ramp to cause said roller assembly to rotate said wheel about said wheel axis and reduce inclinations of said incline ramp and said decline ramp above said roadway surface; and an electrical generator coupled to said wheel and being operative to generate electricity in response to rotation of said wheel about said wheel axis.

9. The system according to claim 8, wherein said roadway surface is a downhill roadway surface.

10. The apparatus according to claim 8, wherein said rotatable incline ramp and said rotatable decline ramp are operative to rotate into positions generally parallel to said roadway surface, in response to the passage of said vehicle over said rotatable incline ramp and said rotatable decline ramp, and to remain generally parallel to said roadway surface until said vehicle has departed said rotatable decline surface, whereupon said counterweight is operative to return said incline ramp and said decline ramp to inclined positions above said roadway surface.

11. The system according to claim 8, wherein said electrical generator is driven by a flywheel that is coupled to and rotationally driven by said wheel.

12. The system according to claim 11, wherein said flywheel is rotatable about a crankshaft having a ratchet mechanism that is operative to allow said flywheel to rotate in a prescribed rotational direction.

13. The system according to claim 12, further including a closed loop web coupled between said flywheel crankshaft and said wheel.

14. The system according to claim 8, wherein said roller assembly includes roller bearings supported by shaft that is coupled to said first portion of said wheel.

15. A method of generating electrical energy comprising the steps of:
(a) providing an electrical generator that includes
a inclined first ramp that is rotatable about an incline axis of rotation proximate a roadway surface on which a vehicle travels,
a declined second ramp having a first portion that is rotatably hinged to said inclined first ramp and second portion that is arranged to travel in a direction generally parallel to said roadway surface, a rotatable wheel that is rotatable about a wheel axis generally parallel to said incline axis of rotation, a roller assembly that is coupled to a bottom surface of said first ramp and is joined with a first portion of said wheel, a counterweight that is joined with a second portion of said wheel, and is operative to urge said roller assembly into contact with said bottom surface of said incline ramp, and rotate said wheel so as to bring said inclined ramp and said decline ramp to inclined positions above said roadway surface in the absence of the passage of said vehicle over said incline ramp, but allowing passage of said vehicle over said incline ramp to cause said roller assembly to rotate said wheel about said wheel axis and reduce inclinations of said incline ramp and said decline ramp above said roadway surface, and an electrical generator coupled to said wheel and being operative to generate electricity in response to rotation of said wheel about said wheel axis; and (b) in response to said vehicle traveling over said first ramp, causing said roller assembly to rotate said wheel about said wheel axis and thereby cause said electrical generator to generate electricity.

16. The method according to claim 15, wherein said roadway surface is a downhill roadway surface.

17. The method according to claim 15, wherein said rotatable incline ramp and said rotatable decline ramp are operative to rotate into positions generally parallel to said roadway surface, in response to the passage of said vehicle over said rotatable incline ramp and said rotatable decline ramp, and to remain generally parallel to said roadway surface until said vehicle has departed said rotatable decline surface, whereupon said counterweight returns said incline ramp and said decline ramp to inclined positions above said roadway surface.

18. The method according to claim 15, wherein said electrical generator is driven by a flywheel that is coupled to and rotationally driven by said wheel.

19. The method according to claim 18, wherein said flywheel is rotatable about a crankshaft having a ratchet mechanism that is operative to allow said flywheel to rotate in a prescribed rotational direction and rotate in a freewheeling manner when said rotatable wheel is rotated in an opposite direction.

20. The method according to claim 15, wherein said roller assembly includes roller bearings supported by shaft that is coupled to said first portion of said wheel.

* * * * *